(12) United States Patent
Heilig et al.

(10) Patent No.: US 6,575,494 B1
(45) Date of Patent: Jun. 10, 2003

(54) ACTIVE HEAD RESTRAINT WITH GAS BAG MODULE

(75) Inventors: Alexander Heilig, Wissgoldingen; Lothar Zink; Andreas Loos, both of Alfdorf; Alfred Scholl, Muehlheim/Ruhr, all of (DE); John Bleau, Holland, MI (US); Juergen Kretschmer, Esslingen (DE)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/662,526

(22) Filed: Sep. 14, 2000

(30) Foreign Application Priority Data

Sep. 14, 1999 (DE) .......................... 299 16 167

(51) Int. Cl.⁷ .............................................. B60R 21/16
(52) U.S. Cl. .................................. 280/728.1; 280/730.1
(58) Field of Search ....................... 280/728.1, 728.2, 280/730.1, 743.1

(56) References Cited

U.S. PATENT DOCUMENTS

| | | | | |
|---|---|---|---|---|
| 3,510,150 A | * | 5/1970 | Wilfert | 280/730.1 |
| 3,779,577 A | * | 12/1973 | Wilfert | 280/730.1 |
| 5,738,407 A | * | 4/1998 | Locke | 297/216.12 |
| 5,816,613 A | | 10/1998 | Specht et al. | |
| 5,833,312 A | * | 11/1998 | Lenz | 297/216.13 |
| 5,842,738 A | * | 12/1998 | Knoll et al. | 297/216.12 |
| 5,911,433 A | * | 6/1999 | Swann | 280/730.2 |
| 6,095,550 A | * | 8/2000 | O'Loughlin et al. | 280/730.1 |
| 6,158,812 A | | 12/2000 | Bonke | |
| 6,199,900 B1 | * | 3/2001 | Zeigler | 280/735 |
| 6,217,118 B1 | * | 4/2001 | Heilig | 297/410 |

FOREIGN PATENT DOCUMENTS

| | | |
|---|---|---|
| DE | 19509014 | 9/1996 |
| DE | 195 48 339 | 6/1997 |
| DE | 297 10 511 | 10/1997 |
| DE | 298 08 982 | 9/1998 |
| DE | 197 57 533 | 10/1998 |
| DE | 299 07 245 | 8/1999 |
| EP | 0593845 | 4/1994 |
| JP | 08072660 | 3/1996 |
| JP | 10006907 | 1/1998 |

* cited by examiner

Primary Examiner—Paul N. Dickson
Assistant Examiner—Faye M. Fleming
(74) Attorney, Agent, or Firm—Foley & Lardner

(57) ABSTRACT

An active head restraint for an automotive seat which includes a base component, a headrest support, and a gas bag module. The base component is connected to the seat. The headrest support is detachably connected to the base component. The gas module is integrated between the base component and the headrest support in such a manner that in a restraining event detected by sensors, the headrest support component is released from the base component by inflating a gas bag.

12 Claims, 2 Drawing Sheets

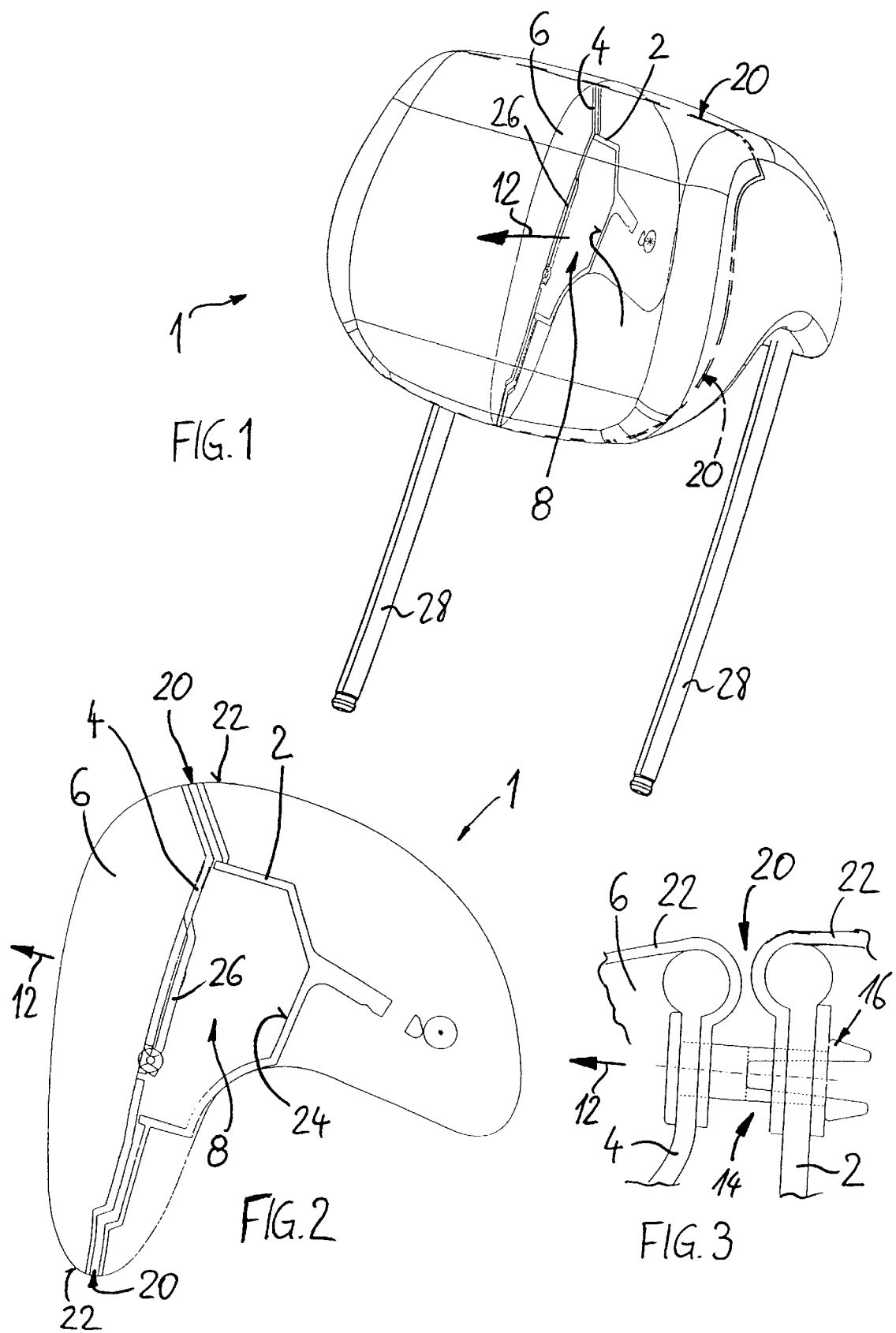

ACTIVE HEAD RESTRAINT WITH GAS BAG MODULE

TECHNICAL FIELD OF THE INVENTION

The present invention relates to an active head restraint for an automotive seat, with an integrated gas bag module of such type, that in a crash, especially a rear-end impact of the vehicle, the distance between the head of the person in question and a supporting surface of the head restraint is actively diminished.

BACKGROUND

Such a head restraint is known from the publication DE 29808982U1. In this case, the gas bag itself emerges out of the head restraint, passing through a module bolster, to reduce the distance to the head of the vehicle occupant. A quite unpredictable and therefore possibly inadequate support for the head could result thereby, above all indeed, if the person should not happen to be seated precisely aligned relative to the head restraint in a "normal seating position," a seating also known as "Out Of Position" (OOP).

The publication DE 29710511U1 describes a head restraint with a so-called expansion device, which increases the head restraint's effective supporting surface in the restraining event, so doing in vertical and/or horizontal direction. At the same time, the entire head restraint is additionally readjusted upwards relative to the seat back, if the head restraint is arranged so close to the back rest that the back rest would prevent complete enlargement of the supporting surface in the vertical direction. The enlargement of the supporting surface can be achieved by inflating a gas bag or by a purely mechanical device, for example by swinging levers or by individual cushion units that move apart. In addition, the entire head restraint can also be moved closer to the occupant's head in a restraining event.

SUMMARY OF THE INVENTION

It is the objective of the present invention to create a head restraint that guaranties increased safety by means of optimized head support with structurally simple and economic means, wherein in particular a simple and rapid reestablishment is also to be possible after a restraining event.

This is achieved according to invention by a head restraint with the characteristics of claim 1. Advantageous further developments and design characteristics are contained in the dependent claims.

According to invention, the head restraint consequently consists of a base component connected to the seat or its back rest, and an additional separate headrest support component, wherein this support component is detachably connected with the base component and a gas bag module is arranged integrated between the base component and support component in such a manner that, in a restraining event detected by sensors, the headrest support component is released from the base component by inflating a gas bag and moved to reduce the distance to the head of a person seated on the seat. Since the headrest support component itself consists of a relatively solid, dimensionally stable material, both the size and shape of the surface of the headrest fastened on the support component remain unchanged while the gas bag inflates, the surface working as a supporting surface. This guarantees a defined head support.

In a preferred embodiment, the detachable connection between the base component and the headrest support component is implemented by fasteners of such a type, that release of the support component from the base component basically only occurs by triggering the gas bag module, and release through manual manipulation is largely excluded. Such manual manipulations can involve resetting the head restraint for the purpose of changing the height and/or inclination. The fasteners ensure that the headrest support component is well mounted upon the base component against relative movements in the direction of the vehicle's transverse axis (Y) and in the direction of the vehicle's vertical axis (Z).

In a preferred embodiment of the invention, it is additionally provided that, in the restraining event, the gas bag enlarges an efficient impact surface in the vertical and/or horizontal direction. For this, the gas bag preferably includes a border region which emerges outwards from the head restraint, i.e. in the Y and Z directions, to enlarge the impact surface in the restraining event, and then completely encloses the headrest frame-like. In most cases, this will then also ensure adequately good head support if the person is situated in a so-called out of position situation.

The gas bag module is lodged in a receptacle within the base component, wherein the receptacle is practically covered lid-like and locked by the headrest support component. The gas bag module can therefore be installed and disassembled in a simple manner, and also be exchanged. The module is detachably fastened by suitable fasteners and connected with a sensor trigger by electrical connecting means. In the case in which, for example, the gas bag module is to be inspected or exchanged without the gas bag first having released the headrest support component from the base component in a restraining event, the support component can be released from the base component on a compulsory basis by appropriate means and the gas bag module's receptacle can thereby be opened, for example with the aid of a tool and/or manually by applying a sufficiently high force that is higher than normal manipulative forces used to adjust the head restraint.

BRIEF DESCRIPTION OF THE DRAWINGS

The invention will be described in more detail based on preferred examples illustrated in the drawing. The drawing shows:

FIG. 1 a perspective view, partially illustrated schematically and opened, of a head restraint according to invention, FIG. 2 a slightly enlarged cross section in the vehicle's x/z plane, FIG. 3 an enlarged detailed illustration, FIG. 4 a view analogous to FIG. 1, wherein the status after triggering is also illustrated, and FIG. 5 a perspective exploded view of the base component and the headrest support component.

DETAILED DESCRIPTION OF THE PREFERRED EMBODIMENT

Figure 4:
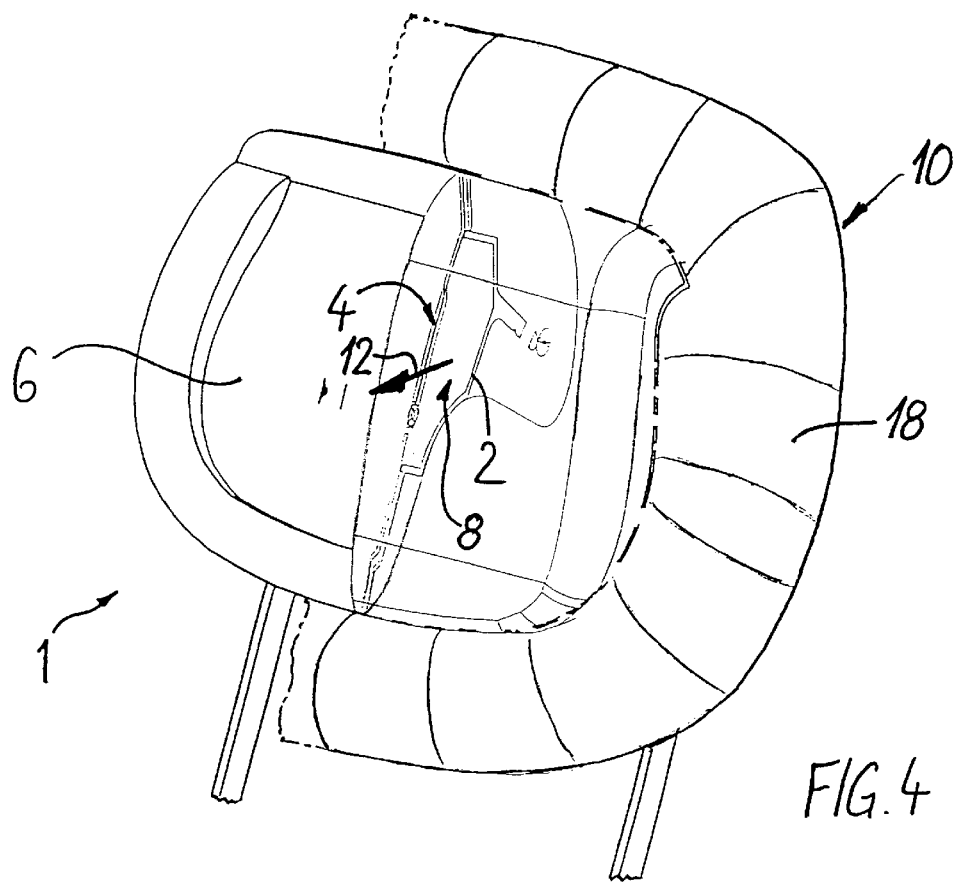

An active head restraint 1 according to invention basically consists of a base component 2 and a support component 4 for a headrest 6. A gas bag module 8, which is only indicated schematically, is arranged integrated between the base component 2 and the headrest support component 4. The support component 4 is normally detachably connected with the base component 2 in such a manner that, in a restraining event detected by sensors (crash, especially rear-end impact), the headrest support component 4 is released from the base component 2 by inflating a gas bag 10 (also see FIG. 4) and then moved together with the headrest 6, basically in the vehicle's X direction, to reduce the distance to the head of a person seated on the seat. This is indicated by an arrow 12 in the figures of interest.

As depicted in FIG. 3, the detachable connection between the base component 2 and the support component 4 is appropriately implemented by fasteners 14 of such a type, that release of the support component 4 from base component 2 by manual manipulation is largely excluded. If for example the area of the front headrest 6 or of the support component 4 is grasped to set the height and/or inclination of the head restraint 1, the fasteners 14 will guarantee an adequate attachment of support component 4 against unintentional release from base component 2. The support component 4 can nevertheless be released from base component 2 by activating the gas bag module 8.

Figure 5:
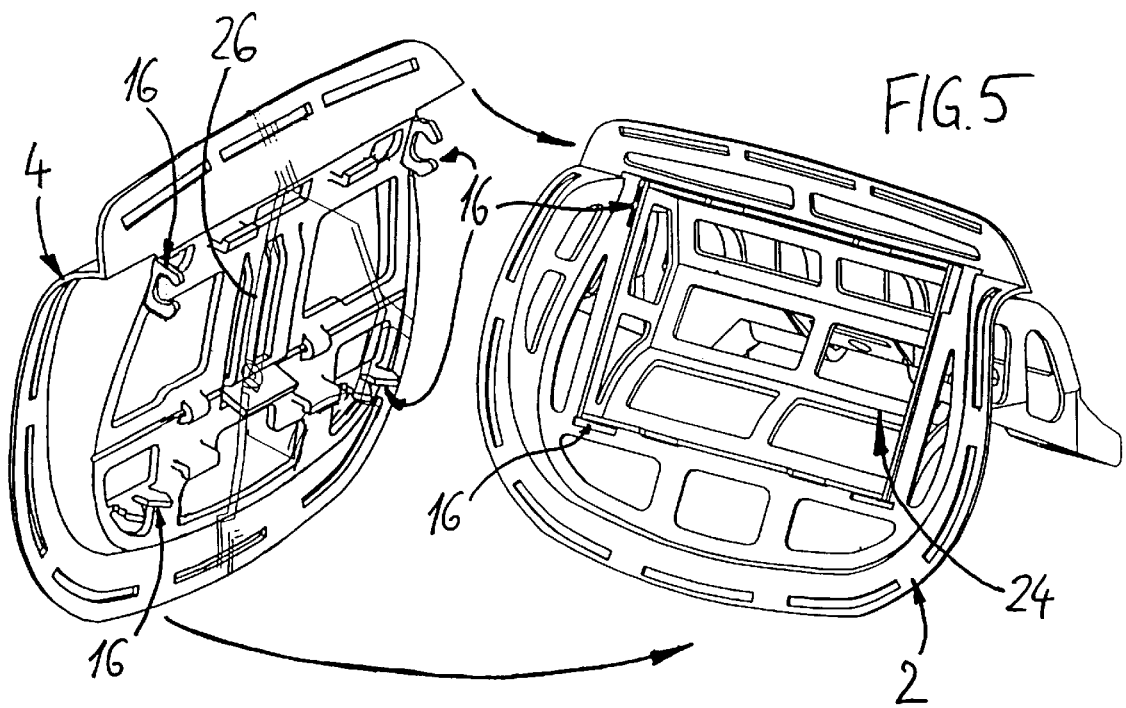

The fasteners 14 are preferably designed as latching means 16, at least partially. Refer to FIG. 5 for this.

In another preferred embodiment, it is provided that the gas bag 10 will enlarge an efficient impact surface in the vertical and/or horizontal direction in the restraining event, as indicated in FIG. 4. In the preferred embodiment, it is provided for this purpose that the gas bag 10 completely encloses the headrest 6 frame-like in the Y and Z directions with a border region 18 which exits outwards from the head restraint 1 to enlarge the impact surface during the restraining event.

As can be determined from FIGS. 2 and 3 in particular, a fully circular gap 20 is formed between the base component 2 and the headrest support component 4, which gap enlarges itself in a restraining event to exit the gas bag border region 18 by means of the movement of the headrest support component 4 caused by gas bag 10.

As depicted in FIG. 2, the gap 20 can be covered by a covering material 22, which is only indicated by a line. In this case, the covering material 22 (cloth, leather, or similar material) tears open across the entire extent of the gap 20, practically as a "tearing seam."

As depicted in FIG. 3, it can also alternatively be provided that the headrest 6 together with its support component 4 on the one hand and the base component 2 (preferably in common with a cushion in the back) on the other hand each be covered with a covering material 22 separately. In this case, the gap 20 will consequently be designed open as a visible gap (design gap). This case has the advantage that no energy must be expended to tear open a covering.

For exchangeable accommodation of the gas bag module 8 in particular, the base component 2 includes a recess 24, which is locked lid-like by the basically plate-shaped headrest support component 4. At the same time, the gas bag 10 is connected with the support component 4 by an unillustrated supporting strap, the connection being approximately in the bag's middle region and preferably detachable. For this, the support component 4 features a retaining tongue 26 out of the material and recessed through a corresponding U-shaped slot, the supporting strap of the gas bag 10 being hung on the retaining tongue. This arrangement prevents the front headrest support component 4, therefore the unit consisting of the support component 4 and the headrest 6, from releasing itself completely when the gas bag 10 unfolds and possibly causing secondary injuries.

As can be determined from FIG. 5 in particular, both the base component 2 and the support component 4 are preferably each made out of plastic as a single-pieced molded part. Each component 2, 4 features an appropriate shape and preferably reliefs or recesses to save material and reduce weight. It relates to plastic-specific shaping to guarantee sufficient mechanical strength and stability.

Let it still be mentioned, that the base component 2 can connect with an unillustrated seat back of the automotive seat, especially by means of two stay bars 28. Additionally, unillustrated means are provided for the electrical connection of the gas bag module 8 in order to trigger, under sensor control, a gas producer for inflating the gas bag 10. The electrical connection can be implemented across the stay bars 28.

The invention is not limited to the examples that have been illustrated and described, but includes all embodiments that operate alike in the spirit of the invention.

We claim:

1. An active head restraint for an automotive seat comprising:
    a base component;
    a headrest support component detachably connected with said base component; and
    a gas bag module, integrated between said base component and said headrest support component in such a manner that, in a restraining event detected by sensors, said headrest support component is completely detached from said base component by inflating a gas bag.

2. The head restraint of claim 1 wherein said detachable connection between said base component and said headrest support component is implemented by fasteners configured such that release of said support component from said base component through manual manipulation is largely excluded.

3. The head restraint of claim 1 wherein said base component and said headrest support component are detachably connected by latching means.

4. The head restraint of claim 1 wherein said impact surface enlarges in the vertical and horizontal direction in the restraining event.

5. The head restraint of claim 4 wherein said gas bag completely encloses a headrest frame with a border region which exits outwards to enlarge the impact surface during the restraining event.

6. The head restraint of claim 5 further comprising a fully circular gap formed between said base component and said headrest support component said gap enlarges itself in a restraining event to exit said gas bag border region by means of the movement of said headrest support component.

7. The head restraint of claim 6 wherein said gap is covered by a covering material, wherein said covering material tears open across the extent of said gap.

8. The head restraint of claim 6 wherein said headrest support component and said base component are each covered with a covering material separately, so that said gap is designed open as a visible gap.

9. The head restraint of claim 1 wherein said base component further comprises a recess for exchangeable accommodation of said gas bag module, wherein said headrest support component covers said recess.

10. The head restraint claim 1 wherein said gas bag is detachably connected with said headrest support component by a supporting strap.

11. The head restraint of claim 1 wherein said base component and said headrest support component are each made out of plastic as a single-pieced molded part.

12. The head restraint of claim 1 wherein said base component is connected to a seat back of an automotive seat by means of two stay bars, wherein means are provided for the electrical connection of said gas bag module.

* * * * *